United States Patent [19]

Lasman et al.

[11] 4,017,656
[45] Apr. 12, 1977

[54] IMITATION LEATHER MATERIAL AND METHOD OF PREPARING SUCH MATERIAL

[75] Inventors: Henry R. Lasman, Andover, Mass.; Robert J. Lebenson, Nashua, N.H.; Reuben Wisotzky, Lexington, Mass.

[73] Assignee: Pandel-Bradford, Inc., Lowell, Mass.

[22] Filed: Sept. 18, 1975

[21] Appl. No.: 614,362

[52] U.S. Cl. .................................. 428/86; 156/306; 427/331; 427/368; 427/371; 427/379; 427/385 B; 427/412; 428/91; 428/95; 428/151; 428/218; 428/246; 428/252; 428/311; 428/315; 428/335; 428/336; 428/337; 428/409; 428/425; 428/904

[51] Int. Cl.$^2$ ..................................... B32B 27/40

[58] Field of Search ............... 428/86, 91, 95, 151, 428/218, 246, 252, 311, 315, 335, 336, 337, 409, 425, 904; 427/331, 368, 371, 379, 385, 407, 412; 156/306

[56] References Cited

UNITED STATES PATENTS

| | | | |
|---|---|---|---|
| 3,399,102 | 8/1968 | Matsushita | 428/86 |
| 3,794,548 | 2/1974 | Wirth | 428/91 |
| 3,816,233 | 6/1974 | Powers | 428/218 |
| 3,933,548 | 1/1976 | Anderson | 428/904 |

*Primary Examiner*—Marion E. McCamish
*Attorney, Agent, or Firm*—Richard P. Crowley

[57] ABSTRACT

An imitation leather material which comprises in combination: a woven fabric base sheet material, one surface of which is a napped surface and the other surface of which is not napped; the napped surface of the base sheet impregnated with a crosslinked polymeric material; the napped impregnated surface of the base sheet characterized by a smooth, buffed, flesh-like surface; an open-cell flexible polymeric foam layer bonded to the other unnapped surface of the base sheet material; a thin polymeric skin layer bonded to the surface of the foam layer; and the thin polymeric skin layer characterized by an imitation leather-like surface.

33 Claims, 2 Drawing Figures

IMITATION LEATHER MATERIAL AND METHOD OF PREPARING SUCH MATERIAL

BACKGROUND OF THE INVENTION

A laminate sheet material suitable for use as imitation leather products in the production of shoes, handbags and the like has been prepared by a number of various techniques. Such imitation leather-like material should have good abrasion and gouge resistance in addition to good hand, drape and physical properties. An additional and important property which is most desirable is the ability of the material to permit the passage of moisture vapor; that is, to be breathable, and thus to duplicate the qualities of natural leather.

Imitation leather materials have been prepared by casting a thin film of a flexible urethane resin polymer onto the surface of a napped and sheared fabric sheet. However, there are several problems associated with the production and use of such imitation leather products, including the nonuniformity of the napped surface and the presence of surface whiskers on the napped surface which tend to protrude through the thin resin film.

Imitation leather products have also employed as a base sheet material a nonwoven material of polyester, rayon or nylon, or blends thereof, such as material prepared on typical carding machines wherein the fabrics are laid down in an overlapping manner and needle-punched and saturated with a binder material to hold the fabrics in place. Often the material is then split to obtain the nonwoven material used as a base sheet. Such nonwoven fabric material often contains high amounts of from about 50 to 60% of a nitrile rubber binder, the balance of the sheet comprising the nonwoven fibers. Such nonwoven fiber sheet materials are expensive, and, due to the presence of a high amount of the binder material, often do not present good drape, hand or shoe-making properties to the resulting laminate product.

Such nonwoven materials also have been employed with a thin foam layer and a thin urethane resin skin layer on the foam layer in an attempt to provide a duplicate imitation leather material.

It is, therefore, most desirable to provide an inexpensive, flexible, improved, composite laminate material suitable for use as imitation leather material which avoids some of the difficulties and expense occasioned with prior art materials.

SUMMARY OF THE INVENTION

Our invention relates to improved, flexible, laminate materials, such as those suitable for use as imitation leather materials particularly for use as shoe-upper materials, and a method of preparing such laminate materials.

In particular, our invention concerns a soft, flexible, improved laminate material which contains as a base fabric a woven fabric having a napped binder-saturated surface and a thin skin resin surface supported on a flexible foam layer, and in which the thin skin foam layer is bonded to the opposite surface of the napped fabric base sheet, and to a method of preparing a composite material so constructed. More particularly, our invention is directed to an imitation leather material which employs a woven fabric sheet material having a napped surface, which napped surface is impregnated with a cross-linked polymer to a limited extent, and the impregnated surface is sanded or buffed to a leather, flesh-like surface, while the opposite surface has under thereon a flexible foam layer having a density gradient, and a thin skin layer to represent an imitation leather surface, such as an embossed grainlike surface.

Our flexible, composite, leather-like, laminate material comprises a thin skin layer, either embossed or unembossed; for example, 0.05 to 3 mils in thickness, particularly of a flexible urethane resin which permits the passage of moisture, and a foam layer comprised essentially of open-cell or breathable foam layer; e.g., having over about 90% open cells, which layer is composed, in our preferred embodiment, of at least two layers of different foam density, the higher density foam layer being adjacent and bonded to the thin skin layer, and the lower density layer adjacent and bonded to the base sheet. Optionally and preferably, an adhesive layer is used to bond the foam layer to a base sheet. A woven fabric base sheet material is used, such as, for example, a polyester-cotton base, one surface of which has a napped surface, the other surface being a non-napped or relatively smooth fabric surface to which the foam layer, such as hot-melt adhesive layer, is secured. The base sheet has a polymeric, cross-linked, saturated, napped fiber layer, such as a cross-linkable or curable elastomer like a nitrile-butadiene cross-linded elastomer, which impregnates the napped fibers of the woven base sheet, and which does not penetrate to an appreciable extent the woven fabric base sheet itself. The elastomeric layer is at least partially cross-linked to remove its thermoplastic character. The surface of the impregnated, elastomeric, napped fibers is buffed, abraded or sanded or otherwise mechanically treated to represent a leather, flesh-like surface, with the ends of the napped fibers exposed on the impregnated flesh-like surface.

One flexible composite laminate provides an imitation leather material with an imitation leather-like top surface and a flesh-like opposite surface, and which material has good abrasion and gouge resistance, and further exhibits excellent hand, drape and temper characteristics which are most desirable for shoe-making properties and operations. Our laminate permits the employment of a napped fabric and the advantages thereof without the disadvantages associated with placing the imitation leather surface on the side of the napped fabric, and further, avoids the use of more expensive and much different nonwoven binder-reinforced sheet materials.

Our flexible laminate material is prepared by impregnating the napped surface of a woven fabric, such as a polyester cotton or other woven fabric, with a cross-linkable or curable polymer, such as an elastomeric polymer like a nitrile elastomer; for example, a nitrile-butadiene latex elastomer subject to cross-linking by heating in the presence or absence of a cross-linking agent. In the preferred embodiment, a nitrile-butadiene carboxylated latex is knife-coated onto the napped surface of the polyester cotton fabric to permit the latex to saturate the napped fibers and to limit the penetration of the latex into the body of the fabric base. The latex fills the interstices of the fabric and of the nap and does not fully penetrate throughout the depth of the base sheet. The degree of penetration is obtained by adjustments in the viscosity of the latex, the angle of the knife, pressure and the speed of coating. The penetration of the latex should be not less than about 30% and not more than about 60% of the base sheet to impart to the base sheet the proper temper. After impregnation of the napped surface, the fabric is heated or otherwise treated to effect full or at least partial cross-linking of the impregnated elastomer so as to render the surface substantially nonthermoplastic in nature and capable of being sanded or buffed.

The impregnated surface is then buffed by sanding the surface, such as through the use of a belt sander or other means, to the impregnated, cross-linked, resin, napped, fiber surface. On completion of the sanding operation, the fibers appear to represent the opposite undernapped side of the surface of the base sheet, and also to represent the flesh side of real sheet leather, but yet permits the passage of moisture through, as well as moisture absorption on, the upstanding ends of the sanded napped fabric with the cross-linked resin between the napped fabric to provide good hand and body thereto. This sanded napped surface can be made of any particular coloration through pigments and dyes employed in the elastomeric latex used to impregnate the surface.

The urethane resin is cast in a thin skin; for example, 0.1 to 2 mils thickness, onto a transfer sheet, such as a release paper, which transfer sheet may also be embossed prior to the casting operation in order to impart the embossed design onto the surface of the ultimate urethane skin. The preparation of the thin skin and foam laminate part of the lainate is described in a copending patent application Ser. No. 460,127, filed Apr. 11, 1974, and assigned to the same assignee as the present invention, which application is hereby incorporated by reference in this application. The urethane resin typically employed is a flexible urethane resin, such as an elastomeric urethane resin, which has good abrasion, scuff and gouge resistance. If desired, other polymers may be employed, provided that such polymers have, or can be treated or processed to have, some moisture-transmission characteristics.

After heating to drive off any solvents and to effect the desired reactions, a single foam layer or preferably a series of foam layers are cast onto the urethane skin while on the transfer sheet. Where two foam layers are used, the higher density foam layer is cast onto the urethane skin first with lower density foam layers subsequently, with at least two layers being formed in the preferred embodiment of the invention; although a series of foam layers of varying density going from the higher to the lower foam density may be employed. The foam layers consist essentially of open-cell, very flexible, resilient foam having a thickness, for example, of from about 3.0 to 30 mils. Closed-cell foam layers, since they do not permit the transfer of moisture, as well as foam layers which are rigid in character, are not satisfactory.

We have found that the foamed core of our laminate product may be comprised in the preferred embodiment of one or more foam layers comprising natural and synthetic polymers, particularly elastomeric materials. Typically materials which may be used include, but are not limited to: a nitrile-butadiene latex foam; a urethane or acrylic latex foam; a chemically blown or mechanically whipped urethane elastomeric foam; a vinyl resin foam; or a two-component mechanically whipped or chemically blown urethane foam. A cross-linkable nitrile-butadiene carboxylated latex foam may be mechanically whipped into a froth layer and employed in our invention. Nitrile-butadiene latex foam and other foam formulations and the method of preparing the foam laminate are described and claimed in the copending application Ser. No. 531,464, filed Dec. 11, 1974, and assigned to the same assignee as the present invention, which application is hereby incorporated by reference in this application.

The nitrile-butadiene foams employed typically comprise acrylonitrile-butadiene carboxylated foam latices which contain a cross-linking agent, such as an amino resin like a melamine curing resin, and optionally acrylate or other monomers to effect the desired degree of cross-linking on heating. Such formulations have a foaming agent added thereto, and air is mechanically whipped into the foam to provide a froth layer which is then placed on top of the urethane skin layer.

A foam layer may also comprise a urethane or acrylic latex or a colloidal latex dispersion of urethane globules of a urethane elastomer which has high solids of over 50% of the urethane. Such urethane elastomer latices when dried dry to a powdery film which is then fused together through heat, and thus are not true latices, but rather are a dispersion. Such urethane elastomer latices may be frothed through the employment of frothing agents and the froth applied to the urethane skin layer and dried and heated to effect heat fusion of the dried urethane particles in an open cellular configuration to provide an open-cell, flexible, urethane foam layer.

Also, chemically blown, 100% urethane, flexible foams, either prefoamed or foamed in place, may be employed in a non-component or two-component blown layer operation to provide an open-cell, flexible, urethane foam, such urethane foams and preparations being well known in the art.

Where a single foam layer is used, the density may range, for example, from 20 to 60 pounds per cubic foot. Where multiple foam layers are used, the higher density foam layer bonded to the urethane skin layer would comprise, for example, a foam layer having a density ranging from about 45 to 65 pounds per cubic foot, while the lower density base-bonded foam layer would comprise a density of from about 35 to 45 pounds per cubic foot, or if desired, multiple layers of foam may be employed, with the foam density ranging from the top of the skin layer to the base of the fabric of from about 55 pounds per cubic foot down to 30 pounds per cubic foot. Where the foam layer is obtained by mechanically frothing air into the polymer per se, variation in the incorporation of air can vary the density, while in chemically blown foams, variation in the amount of the blowing agent and the type of blowing agent determine the foam density.

Optionally, but desired in the preferred embodiment, the foam layers are secured to the base woven fabric layer through the use of an adhesive layer. The thin adhesive layer is placed on top of the foam layer, such as by coating, typically as a hot-melt adhesive comprised of a polymer, hydrocarbon resins, a plasticizer, waxes or combinations thereof, which are quite tacky on heating, and on cooling solidify to secure the foam layer to the unnapped surface of the woven fabric sheet.

After the coating of the adhesive layer onto the top surface of the foam layer, the unnapped surface of the fabric, the opposite surface of which has been sanded and buffed, is then laid onto the wet adhesive layer, and the composite laminate then heated and subsequently cooled to provide a flexible, composite, laminate product characterized by an imitation leather-like surface occasioned by the thin skin urethane layer, and the opposite surface comprising a buffed, flesh-like surface of the saturated cross-linked elastomer, with the ends of the napped fabric exposed for the passage of moisture. After heating and forming of the composite layer, the transfer sheet, such as a Teflon belt or a paper sheet, with a silicone or other treated surface to facilitate removal, is removed, such as by stripping, and the product then employed in a shoe-making or handbag or other operation as desired.

The ultimate product has good moisture transfer and permeability characteristics in that the open-cell foam layers permits the passage of a high percent of moisture, particularly where the latex layer contains a hydroscopic emulsifying agent, as it typically does, while the thinness in character of the urethane skin permits the passage of moisture also, as does the base fabric with the sanded back surface thereof. The product avoids the difficulties associated with characteristics of more expensive nonwoven binder sheet materials, and avoids the problems associated with the use of vinyl skins and vinyl foams on such nonwoven fabric materials.

Our invention will be described for the purpose of illustration in connection with the preparation of a particular and preferred flexible imitation leather laminate and to a particular method of preparing such laminate. However, it is recognized that other persons skilled in the art may make various changes and modifications in our product and method within the spirit and scope of our invention.

DESCRIPTION OF THE EMBODIMENTS

Figure 1:
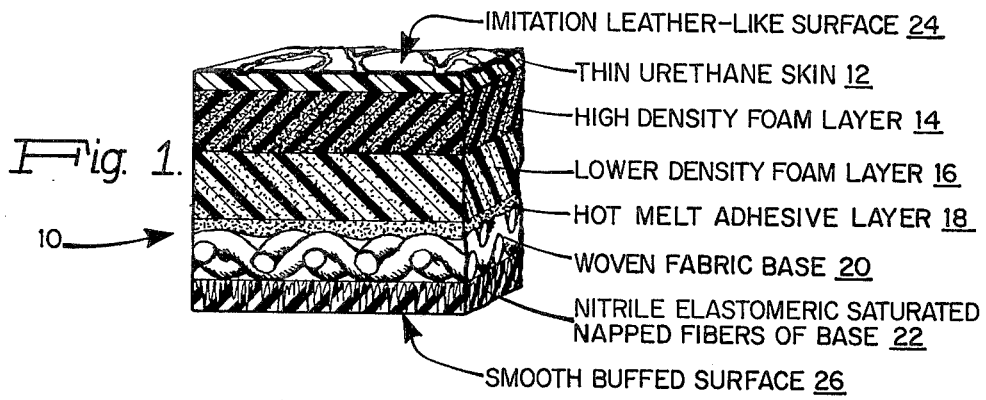
FIG. 1 is a schematic, representative, cross-sectional view of a flexible imitation leather laminate of our invention.

FIG. 1 shows a flexible imitation leather laminate product 10 of our invention which comprises a thin urethane resin skin layer 12 characterized by an imitation leather-like surface, such as a grain-embossed surface design 24, a high density flexible carboxylated cross-linked nitrile elastomer foam layer 14, a low density flexible carboxylated nitrile elastomer foam layer 16, a thin resin adhesive layer 18, a woven fabric base sheet 20, with the opposite napped surface of the base sheet impregnated with a cross-linked carboxylated nitrile elastomer 22 to a depth of about 40 to 50%, and characterized by a buffed surface 26.

Figure 2:
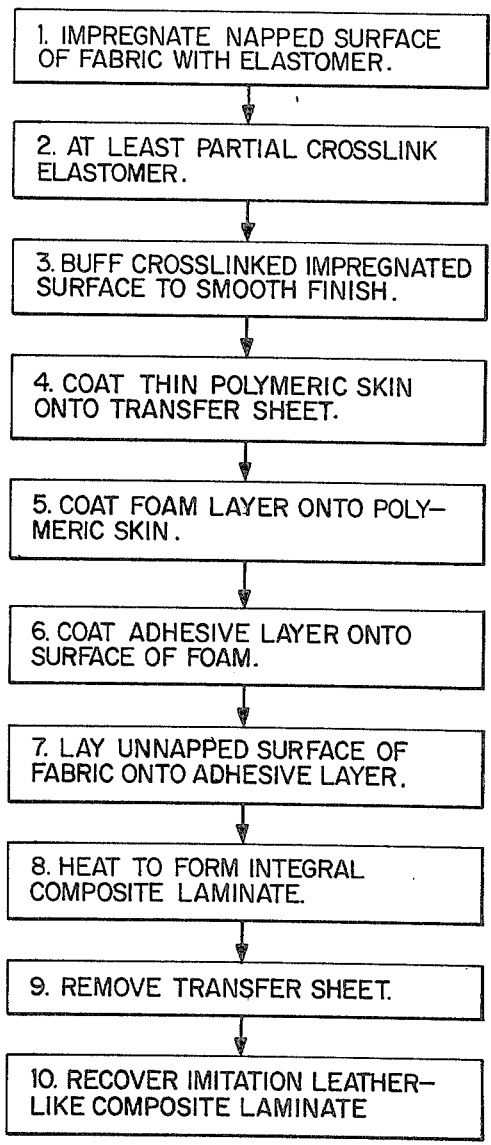
FIG. 2 is a schematic block diagram of the steps of preparing the laminate of FIG. 1.

FIG. 2 sets forth the preferred steps employed in preparing the laminate of FIG. 1. The base fabric material comprises a polyester-cotton 7 oz/sq yd weight fabric, count 60 × 60, a 1 × 4 filling face sateen napped to a dense pile, 45–55 mils in thickness. The fabric is impregnated by the use of a composition which comprises:

a. Hycar Latex 1572 × 45 - a heat-curable carboxylated acrylonitrile-butadiene rubber of B.F. Goodrich Chemical Co. (contains cross-linking agent) - 52 gallons;
b. sodium polyacrylate thickener - about 3,000 grams; and
c. water-dispersed color (as required) 5% on the dry polymer.

The formulation is adjusted to a final viscosity of 4,000 cps, with solids of about 50% by weight.

The fabric is impregnated by a floating knife on the napped side of the fabric at a rate of 1 gallon per 10 yds. of fabric to provide a weight of fabric after impregnation of about 9 ½oz/sq yd (e.g., impregnate dry weight to fabric 1 to 3 oz/sq yd).

The impregnated fabric is dried by passing the fabric through a two-zone hot-air oven at 400 yds/hour: first zone (13 feet) temperature 400° F, and second zone (20 feet) temperature 450° F. The impregnated dried and cured fabric is then buffed on a belt sander using 180-grit sandpaper. The fabric is buffed to the desired smooth finish, and if two or more passes through the sander are used, the second and other passes are in the opposite direction to the first pass.

A first solvent pigmented aliphatic polyester urethane elastomer resin having a viscosity of about 12,000 cps 72° F is knife-coated onto an embossed paper release sheet. The release sheet is embossed with a grain-like imitation leather design. The first coating fills in the depressed areas of the sheet and typically has a thickness of 0.2 to 0.5 mils (dry), and is a discontinuous layer. The sheet is heated in a hot-air oven to dry the urethane resin. A second pigmented aliphatic polyester urethane elastomer resin solution, with a viscosity of 5,000 cps 72° F, is coated onto the release paper in a continuous layer by a knife coater to a thickness of about 1 to 2 mils (dry), and then oven-dried. The first and second resins may be the same or preferably are different, with the first resin having a high modulus of elongation at 100% elongation of greater than 800 psi from the second resin; e.g., the first resin 2,000 to 8,000 psi and the second resin 300 to 3,000 psi. Optionally, a thin layer of an adhesive can be applied to the second coating layer if desired, such as a urethane elastomeric resin.

In one embodiment, a urethane latex is used to prepare the two-layer foam, although, as described, other polymers and foam techniques can be employed, provided only that the foam is a soft flexible open-cell foam. A typical satisfactory urethane latex is Rucothane 933 (a trademark of Hooker Chemical Corp.), with 65% nonvolatiles, bulk density 9.2 lbs/gal, pH 8.5, and viscosity at 23° 10,000 cps at 2 rpm.

The urethane latex is foamed by passing through an Oakes mixer or a similar mechanical mixer or whipping device to incorporate air into the latex to an apparent density of 7 lbs/gal corresponding to 1.3 × blow. The latex froth is then applied onto the second coating of the release paper at the rate of about 15 mils (wet). The foam layer is passed through a 13-foot hot-air oven at 250° F to dry the foam, followed by passage through a 20-foot hot-air oven at 350°– 400 F to cure the foam. The rate of throughput in both ovens is at 80 – 100 yds/hour. A second foam layer is coated onto the cured first foam layer. The second foam layer preferably uses the same urethane latex, but may be a different latex or polymer as desired. The second urethane latex is frothed to an apparent density of 5.8 lbs/gal (1.6 × blow). The second foam layer is applied, dried and cured as the first foam layer. If desired, a different thickness may be used in the first and second layers. The cured foam layers are air-cooled and then a thin layer of an adhesive is applied to the surface of the dried second foam layer; for example, 10 mils (wet) of a urethane latex, the same or similar to that used in preparing the foam layer.

The nitrile-impregnated buffed fabric base sheet is then laid into the wet adhesive urethane layer, with the uncoated smooth fabric side down into the wet layer. The laminate so formed is then dried at 250 – 300° in a first 13-foot oven and cured at 300 – 350° F in a second 20-foot oven at a rate of 80 – 160 yds/hr. The laminate is then cooled and the release paper stripped off the urethane resin to provide an imitation leather-like urethane surface. If desired and preferably, the laminate top urethane surface is then printed or top-coated with a thin clear or pigmented urethane coating to provide the desired design or color effects, or where a clear coating is used, to enhance and accentuate the grain of the surface. Optionally, as in the copending application Ser. No. 460,127, flexing, tumbling or breaking of the laminate may be use to accentuate the grain of the surface.

The above example may be repeated for one or both of the foam layers employing a carboxylated acrylonitrile-butadiene latex as follows:

| INGREDIENTS | WEIGHT BY PARTS |
|---|---|
| 1. Hycar 1572 × 45 latex, a carboxylated acrylonitrile-butadiene emulsion copolymer from B.F. Goodrich Co. | 100 |
| 2. Sodium lauryl sulfate, a surfactant agent | 1 |
| 3. Cymel 303 latex curing agent, a hexamethoxymethyl melamine condensate from American Cyanamide Corp. | 5 |
| 4. Paratoluene sulfonic acid, an acid catalyst | 1 |
| 5. Ammonium hydroxide (28%) | — |
| 6. Ammonium stearate as a foaming agent (surfactant) | 4 |
| 7. Thickening agent - ASE 95, a polyacrylate polymer from Rohm & Haas Co. | 1 |

The ingredients are mixed in the order of Nos. 1, 2, 3 and 4, then ammonium hydroxide is added to adjust the pH to the alkaline side. Ammonium stearate (No. 6) and the thickener (No. 7) are then added and the formulation readjusted with ammonium hydroxide to a pH of 8.8 and a viscosity of about 9,000 cps.

Other methods of coating may be used to form our improved laminate, such as directly bonding each layer to the base sheet.

Our imitation leather material may also be composed of flexible open-cell; e.g., over about 90% open-cell, vinyl resin foam, such as a polyvinyl chloride or vinyl chloride-vinyl acetate foam, a single or multiple layer of foam with the same or a different vinyl resin on the skin layer.

A thin plasticized vinyl resin skin layer 12 having a thickness of about 3 mils may comprise a dense, deaerated compound of the following composition:

| | |
|---|---|
| VC 440 | 92.3 parts |
| (PVC homopolymer, Borden Chemical Co.) | |
| EH 219 | 7.7 parts |
| (PVC homopolymer, Ethyl Corp.) | |
| A straight-chain octyl-decyl phthalate as a plasticizer | 82.2 parts |
| Epoxidized soybean oil as a plasticizer | 3.6 parts |
| A Ca-Zn liquid stabilizer Mark 1221, Argus Chemical Co. | 3.7 parts |
| Pigments | 20.0 parts |

A low-density vinyl foam layer 14 is prepared which comprises:

| | |
|---|---|
| A cast thickness of | .0085" |
| which expands to | .030" |
| (corresponding to 3.5 × blow) | |
| Low-density composition: | |
| Geon 124 | 100.0 parts |
| (medium MW homopolymer resin, B.F. Goodrich Chemical Co.) | |
| Di-2-ethyl hexyl phthalate as a plasticizer | 96.5 parts |
| 50% dispersion of azodicarbonamide as a blowing agent in dioctyl phthalate (Kempore SD125 of Polychem Div., Stepan Chemical Company) | 10.0 parts |
| A Zn-octoate-koleate activator-stabilizer (Actafoam R3, Polychem Div., Stepan Chemical Co.) | 2.4 parts |
| Epoxidized soybean oil | 3.4 parts |
| Dry ground limestone | 44.4 parts |

A high-density vinyl foam layer 16 and hot-melt adhesive layer 18 are prepared which comprise:

| | |
|---|---|
| A cast thickness of | .012" |
| which expands to | .024" |
| (corresponding to 2 × blow) | |
| Composition: | |
| Medium MW homopolymer PVC resin (Geon 124) | 100.00 parts |
| di-2-ethyl-hexyl phthalate | 96.5 parts |
| Epoxidized soybean oil | 3.4 parts |
| 50% dispersion of azodicarbonamide as a blowing agent in di-octyl phthalate (Kempore SD125) | 4.6 parts |
| A Zn-octoate-koleate activator-stabilizer (Actafoam R3) | 2.4 parts |
| Dry ground limestone | 44.4 parts |

The process of preparing the leather material is as described before, except for layers 12, 14 and 16. The process includes casting on smooth S.D. Warren paper EHR as follows:
1. Cast and gel to dryness first skin 12;
2. Cast and gel to dryness first foam layer 14;
3. Cast and gel to tack second foam layers 16 and 18;
4. Lay the treated fabric 20 into the tacky hot-melt foamable adhesive layer;
5. Expand in a 60-foot hot-air oven, air temperature 460° F, laminate throughput at the rate of 500 yds/hr; and
6. Cool to room temperature.

The total thickness after expansion is about 0.090 inches.

An imitation leather surface is obtained by embossing by:
1. Applying a urethane top coating having good adhesion properties to vinyl, such as Permuthane U-6130 (Manufactured by Permuthane Div., Beatrice Chemical Company) using two 80-line quadra-gravure rolls;
2. Drying in a hot-air oven and applying additional heat to the surface by means of Cromolux heaters to bring the surface temperature to 320 to 330° F; and then
3. Passing through a fixed gap embossing roll to impart embossed, leather-like grain and surface feel.

The total thickness after embossing ranges from about 0.075 to 0.065 inches.

Our invention has been described in its preferred embodiments with reference to an improved leathersubstitute laminate material. However, substitutions and modifications may be made without departing from the scope of our invention.

What we claim is:

1. An imitation leather material which comprises in combination:
   a. a woven fabric base sheet material, one surface of which is a napped surface and the other surface of which is not napped;
   b. the napped surface of the base sheet impregnated with a cross-linked polymeric material;
   c. the napped impregnated surface of the base sheet characterized by a buffed, flesh-like surface;
   d. an open-cell flexible polymeric foam layer bonded to the other unnapped surface of the base sheet material;
   e. a thin polymeric skin layer bonded to the surface of the foam layer; and
   f. the thin polymeric skin layer characterized by an imitation leather-like surface.

2. The material of claim 1 wherein the cross-linked polymeric material comprises a cross-linked nitrile elastomer.

3. The material of claim 1 wherein the foam layer is characterized by a foam density gradient with the higher density foam adjacent to the thin polymeric layer.

4. The material of claim 1 wherein the foam layer comprises two or more foam layers of different foam density.

5. The material of claim 1 wherein the foam layer comprises two or more foam layers composed of different foam materials and different foam densities, the higher density foam adjacent the thin polymeric skin layer.

6. The material of claim 1 wherein the polymeric skin layer is an elastomeric urethane resin.

7. The material of claim 1 wherein the laminate comprises an adhesive layer to bond the foam layer to the unnapped surface of the fabric base sheet material.

8. The material of claim 1 wherein the leather-like surface is characterized by a grain-like surface composed of raised and low areas.

9. The material of claim 1 wherein the foam layer comprises a nitrile elastomeric foam layer, a urethane foam layer, an acrylic foam layer, or vinyl chloride foam layer.

10. The material of claim 1 wherein the skin polymeric layer is from about 0.1 to 3 mils in thickness, and the foam layer is from about 3 to 30 mils in thickness.

11. The material of claim 1 wherein the foam layer comprises two foam layers of different foam densities and ranging from about 20 to 60 pounds per cubic foot.

12. The material of claim 1 wherein the impregnated polymeric material impregnates the base sheet from about 30 to 60% of its thickness.

13. The material of claim 1 wherein the buffed ends of the napped fibers are exposed on the surface.

14. The material of claim 1 wherein the foam layer comprises a flexible foam layer having over about 90% open-cell structure.

15. The material of claim 1 wherein the base sheet material is impregnated up to a thickness of about 60% in depth with from 1 to 3 dry ounces/square yard of the cross-linked polymeric material.

16. The material of claim 1 wherein the polymeric thin-skin layer with the surface is an embossed surface and comprises a urethane elastomeric resin with raised areas on the skin layer composed of a discontinuous layer of a first urethane resin forming the desired embossed pattern on a continuous layer of a second urethane resin, the first urethane resin having a modulus of elongation at 100% elongation of greater than 800 psi than the second resin.

17. The material of claim 16 wherein the first resin has a modulus of elongation at 100% elongation of 2000 to 8000 psi, and the second resin 300 to 3000 psi.

18. The material of claim 1 wherein the foam layer is a flexible, open-cell, cross-linked, carboxylated, acrylonitrile-butadiene foam material.

19. An imitation leather sheet material which comprises in combination:
   a. a woven fabric base sheet material, one surface of which is napped and sheared, and the other surface of which is not napped;
   b. the fabric of the napped surface of the base sheet material impregnated with at least a partially cross-linked nitrile elastomeric polymer material;
   c. the impregnated napped surface characterized by a buffed, flesh-like leather appearance;
   d. a substantially open-cell flexible polymeric foam layer of from about 3 to 30 mils composed of at least two layers of different foam densities, the foam layer composed of a nitrile elastomer, a urethane resin, an acrylic resin or a vinyl chloride resin, the layers bonded together;
   e. an adhesive layer which bonds the lower density foam layer to the unnapped surface of the base sheet material;
   f. a thin urethane elastomeric resin skin layer of from about 0.1 to 3 mils bonded to the surface of the higher density foam layer; and
   g. the skin layer characterized by an embossed grain-like leather-like surface therein composed of raised and low areas.

20. A method of preparing an imitation leather-like material which comprises:
   a. impregnating the napped surface of a woven fabric base sheet material having a napped or an unnapped surface with a cross-linkable flexible polymer;
   b. cross-linking the cross-linkable polymer to form at least a partially cross-linked polymer surface;
   c. buffing the cross-linked impregnated surface to provide a flesh-like leather surface;
   d. bonding a flexible open-cell foam layer to the unnapped surface of the base sheet material; and
   e. bonding a thin polymeric flexible skin layer to the foam layer, the skin layer characterized by a leather-like surface appearance.

21. The method of claim 20 which includes coating the thin polymeric skin layer onto a transfer sheet having an embossed design thereon and bonding the foam layer to the thin skin layer on the transfer sheet, and after bonding the opposite surface of the foam layer to the base sheet material removing the transfer sheet.

22. The method of claim 20 which includes applying an adhesive layer to bond the foam layer to the base sheet material.

23. The method of claim 20 which includes applying a series of at least two foam layers of different foam densities on the foam layer, with the surface of the foam layer of greater density bonded to the skin layer and the surface of the lower density foam layer bonded to the base sheet material.

24. The method of claim 20 wherein the polymeric skin layer is an elastomeric urethane resin.

25. The method of claim 20 wherein the foam layer comprises a nitrile elastomeric foam layer, a urethane foam layer, an acrylic foam layer or vinyl chloride foam layer.

26. The method of claim 20 wherein the skin polymeric layer is from about 0.1 to 3 mils in thickness, and the foam layer is from about 3 to 30 mils in thickness.

27. The method of claim 20 wherein the cross-linked polymeric material comprises a cross-linked nitrile elastomer.

28. The method of claim 20 wherein the impregnation of the polymer does not exceed about 60% of the depth of the base sheet material.

29. The method of claim 20 wherein the foam density of the layer ranges from about 30 to 60 pounds per cubic foot.

30. The method of claim 20 which includes buffing the impregnated surface to expose the ends of the napped fibers on the flesh-like leather surface.

31. The method of claim 20 which includes:
 a. coating an embossed transfer sheet with a first urethane elastomeric resin coating to form a discontinuous layer of the first resin which fills in the embossed design on the transfer sheet; and
 b. coating the first resin layer with a second urethane elastomeric resin continuous layer, the first urethane resin having a modulus of elongation at 100% elongation of greater than 800 psi than the second urethane resin to provide an embossed skin layer.

32. The method of claim 20 which includes flexing the leather-like material to accentuate the grain of the embossed surface.

33. A method of preparing an imitation leather-like material, which method comprises:
 a. impregnating the napped and sheared surface of a woven fabric sheet material having a napped and an unnapped surface with a cross-linkable nitrile elastomeric polymer;
 b. cross-linking the impregnated elastomeric polymer;
 c. buffing the cross-linked polymer surface to provide a flesh-like leather surface;
 d. coating a thin skin layer of from 0.1 to 3 mils of a flexible elastomeric urethane resin onto a transfer sheet having an embossed grain-like surface thereon;
 e. coating a series of at least substantially open-cell foam layers onto the skin layer, the foam layers composed of an elastomeric foam, an acrylic foam or a urethane foam, the foam layers having a thickness of from about 3 to 30 mils, the foam layers having a difference in foam densities;
 f. coating a thin layer of an adhesive resin onto the exposed surface of the foam layer;
 g. placing the unnapped surface of the base sheet material onto the adhesive layer;
 h. heating the laminate so formed to bond the coating layers together and to the base sheet material to form an integral, flexible, composite sheet material;
 i. removing the transfer sheet; and
 j. recovering a flexible, leather-like laminate material with a grain-like embossed surface on the skin layer and a leather flesh-like surface on the opposite surface.

* * * * *

Notice of Adverse Decision in Interference

In Interference No. 100,951, involving Patent No. 4,017,656, H. R. Lasman, R. J. Lebenson and R. Wisotzky, IMITATION LEATHER MATERIAL AND METHOD OF PREPARING SUCH MATERIAL, final judgment adverse to the patentees was rendered July 27, 1983, as to claims 1-33.
[*Official Gazette November 15, 1983.*]